(12) United States Patent
Mohammed Mikaeil Salih et al.

(10) Patent No.: US 12,464,321 B2
(45) Date of Patent: Nov. 4, 2025

(54) METHOD FOR DYNAMIC MBMS CONTROL, USER EQUIPMENT AND TELECOMMUNICATION SYSTEM

(71) Applicant: JRD COMMUNICATION (SHENZHEN) LTD., Shenzhen (CN)

(72) Inventors: Ahmed Mohammed Mikaeil Salih, Shenzhen (CN); Jia Sheng, Shenzhen (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 419 days.

(21) Appl. No.: 18/003,908

(22) PCT Filed: Jul. 1, 2020

(86) PCT No.: PCT/CN2020/099789
§ 371 (c)(1),
(2) Date: Dec. 29, 2022

(87) PCT Pub. No.: WO2022/000383
PCT Pub. Date: Jan. 6, 2022

(65) Prior Publication Data
US 2023/0179960 A1 Jun. 8, 2023

(51) Int. Cl.
*H04W 4/06* (2009.01)
*H04W 72/121* (2023.01)
(Continued)

(52) U.S. Cl.
CPC ........... *H04W 4/06* (2013.01); *H04W 72/121* (2013.01); *H04W 72/23* (2023.01); *H04W 72/30* (2023.01);
(Continued)

(58) Field of Classification Search
CPC ........... H04W 4/00; H04W 4/06; H04W 4/08; H04W 72/00; H04W 72/12;
(Continued)

(56) References Cited

U.S. PATENT DOCUMENTS

| 2003/0194992 | A1* | 10/2003 | Kim | H04W 72/30 |
| | | | | 455/414.1 |
| 2004/0017809 | A1* | 1/2004 | Park | H04W 4/00 |
| | | | | 370/432 |

(Continued)

FOREIGN PATENT DOCUMENTS

| CN | 102088660 A | 6/2011 |
| CN | 102281503 A | 12/2011 |

(Continued)

OTHER PUBLICATIONS

European Search Report in European application No. 20943549.4, mailed on Feb. 7, 2024.
(Continued)

*Primary Examiner* — Warner Wong
(74) *Attorney, Agent, or Firm* — PV IP PC; Wei Te Chung

(57) ABSTRACT

A method for dynamic MBMS control is proposed for a network node in a MBSFN service area to provide MBMS services to one or more UEs. A telecommunication system and a UE implementing the method are also proposed. A plurality of indication messages are received from one or more UE. Each of the indication messages comprises an indication about the service type and/or the QoS information for one or more MBMS services. At least one control configuration is determined based on to the required one or more MBMS services. The at least one control configuration are transmitted to the UEs, so that the UEs are configured to efficiently receive the required service.

15 Claims, 4 Drawing Sheets

(51) Int. Cl.
*H04W 72/23* (2023.01)
*H04W 72/30* (2023.01)
*H04W 72/543* (2023.01)
*H04L 67/566* (2022.01)

(52) U.S. Cl.
CPC ......... *H04W 72/543* (2023.01); *H04L 67/566* (2022.05)

(58) Field of Classification Search
CPC ... H04W 72/121; H04W 72/20; H04W 72/21; H04W 72/23; H04W 72/30; H04W 72/50; H04W 72/54; H04W 72/543; H04W 36/0007; H04L 2012/3638; H04L 2012/5638; H04L 12/1822; H04L 63/104; H04L 67/566
See application file for complete search history.

(56) References Cited

U.S. PATENT DOCUMENTS

| | | | | |
|---|---|---|---|---|
| 2005/0020260 A1* | 1/2005 | Jeong | ................. | H04W 72/30 455/434 |
| 2005/0152392 A1* | 7/2005 | Lim | ................. | H04L 12/1886 370/493 |
| 2006/0156370 A1* | 7/2006 | Parantainen | ......... | H04W 76/40 725/50 |
| 2008/0049697 A1* | 2/2008 | Breuer | ................. | H04W 72/23 370/341 |
| 2008/0181158 A1* | 7/2008 | Bouazizi | ................. | H04L 67/14 370/312 |
| 2008/0293399 A1* | 11/2008 | Xu | ................. | H04W 76/12 455/422.1 |
| 2010/0080159 A1 | 4/2010 | Hu et al. | | |
| 2010/0203921 A1* | 8/2010 | Hannu | ................. | H04W 8/26 455/90.2 |
| 2012/0033602 A1* | 2/2012 | Guo | ................. | H04M 15/80 370/312 |
| 2012/0099509 A1* | 4/2012 | Al | ................. | H04L 1/007 370/312 |
| 2012/0300688 A1* | 11/2012 | Gholmieh | ................. | H04W 4/08 370/312 |
| 2014/0177506 A1 | 6/2014 | Korus | | |
| 2016/0373903 A1 | 12/2016 | Zeira et al. | | |

FOREIGN PATENT DOCUMENTS

| | | | | |
|---|---|---|---|---|
| CN | 102440066 A | 5/2012 | | |
| CN | 103379447 A | 10/2013 | | |
| CN | 105979587 A | 9/2016 | | |
| CN | 110546967 A | 12/2019 | | |
| WO | 2015069407 A1 | 5/2015 | | |
| WO | 2015113802 A1 | 8/2015 | | |
| WO | WO-2017054544 A1 * | 4/2017 | ............ | H04L 12/28 |
| WO | 2018015612 A1 | 1/2018 | | |
| WO | WO-2022028199 A1 * | 2/2022 | ............ | H04W 4/08 |

OTHER PUBLICATIONS

3rd Generation Partnership Project; Technical Specification Group Services and System Aspects; Study on Multimedia Broadcast and Multicast Service(MBMS) usage for mission critical communication services (Release 14), 3GPP Draft; 23780-120_TR_MBMS_MCSERVICES_RM, 3rd Generation Partnership Project (3GPP), Mobile Competence Centre; 650, Route Des Lucioles; F-06921 Sophia-Antipolis Cedex; France, May 2, 2017(May 2, 2017), XP051270070.

Chinese Office Action issued in corresponding Chinese Patent Application No. 202080102507.1 dated Jul. 22, 2024, pp. 1-10.

International Search Report in International application No. PCT/CN2020/099789,mailed on Mar. 25, 2021.

Written Opinion of the International Search Authority in International application No. PCT/CN2020/099789,mailed on Mar. 25, 2021.

Huawei, "Summary of moderated email discussion on Rel-17 NR Multicast Broadcast", 3GPP TSG-RAN #85 RP-191859, Sep. 9, 2019(Sep. 9, 2019) the whole document.

* cited by examiner

METHOD FOR DYNAMIC MBMS CONTROL, USER EQUIPMENT AND TELECOMMUNICATION SYSTEM

CROSS REFERENCE TO RELATED APPLICATIONS

This application is a US national phase application based upon an International Application No. PCT/CN2020/099789, filed on Jul. 1, 2020, the content of which is incorporated herein by reference in its entirety.

BACKGROUND

Field of the Invention

The invention relates to multimedia broadcast/multicast service (MBMS) system, and particularly, to a telecommunication system with an improved service control over a Multimedia Broadcast Multicast Service Single Frequency Network (MBSFN) service area.

Description of the Related Art

MBMS was developed by the 3rd Generation Partnership Project (3GPP) for 3G networks to support video broadcasting and streaming services, and later 3GPP has introduced the evolved MBMS (eMBMS) for the Evolved Packet System (EPS).

In Rel-13 and Rel-14, the MBMS system has been updated to support new services such as Public Safety, Consumer Internet of Things (CIoT), Vehicle to Everything (V2X), and Machine Type Communication (MTC) features. For example, the group based communication addressing MTC feature is specified in TS 22.368 and the architecture enhancements to facilitate communications with packet data networks and applications (e.g. MTC applications) is specified in TS 23.682 where the user service for UEs using group message delivery using MBMS are specified. The discussion on 5G broadcast evolution in radio access network (RAN) has took place between RAN #78 and RAN #80, summarizing the MBMS technical attributes into "terrestrial broadcast i.e. further evolved MBMS or FeMBMS, RP-181342" and "NR mixed mode multicast/broadcast, RP-180669". The discussion lead to a recommendation that to leave the standardization of "NR mixed mode broadcast/multicast" to further releases because of the higher priority of other NR Rel-15 study/work items and proceed with the study on LTE Rel-16 terrestrial broadcast. The discussion lead to a recommendation that to leave The standardization of "NR mixed mode broadcast/multicast" to further releases because of the higher priority of other NR Rel-15 study/work items and proceed with the study on LTE Rel-16 terrestrial broadcast. Therefore, the LTE Rel-16 working item (WI) on enhanced EN-TV was approved in RAN #83, This WI was targeting introduction of new PHY frame structures with new CPs and the related designs to support enhanced EN-TV services (FeMBMS agreements list, R1-1613790).

The main attributes of "terrestrial broadcast" are broadcast only, or DL-only on large and static transmission areas which can typically be achieved using High-Power High-Tower deployments. There is no broadcast/multicast feature support is specified in the first two NR releases, i.e. Rel-15 and Rel-16. Nevertheless, there are important use cases for which broadcast/multicast could provide substantial improvements, especially in system efficiency and user experience.

Recently, a study item on the architectural enhancements for 5G multicast-broadcast services is approved in SA2 (SP-190625). The objective A of SA2 study item is about enabling general MBMS feature over 5G NR system (5GS), and the uses cases identified that could benefit from this feature include (but are not limited to) public safety and mission critical, V2X applications, transparent IPv4/IPv6 multicast delivery, IPTV, software delivery over wireless, group communications and IoT applications. The Objective B of SA2 study item is to support broadcast service (e.g. linear TV, Live, smart TV, and managed and OTT content, radio services).

In RAN #86 a new working item is approved targeting NR RAN support of Multicast and Broadcast Services (RP-193163). The aims of this working item description (WID) is to provide the support in RAN for Objective A, consistently with TR 23.757 (study on architectural enhancements for 5G multicast-broadcast services, Rel-17 NR). In particular, support of public safety and mission critical as design goals as identified during the SA6 Study on enhanced Mission Critical (MC) services over 5G multicast-broadcast system (SP-190726) and captured in TR 23.774 and the requirements identified by SA1 in TS22.261, clause 6.13.2. One of the key objectives and goals of RP-193163 WID is to study support of dynamic control of the Broadcast/Multicast transmission area within one gNB-DU and the RAN requirements to enable it.

On the topic of dynamic control over a MBMS service area, however, there are still challenges and limitations unsolved.

BRIEF SUMMARY OF THE INVENTION

A detailed description is given in the following embodiments with reference to the accompanying drawings.

A method for dynamic MBMS control is proposed for a MBSFN service area to provide MBMS services to one or more UEs. A plurality of indication messages are received from one or more user equipment (UEs). Each of the indication messages comprises an indication about the service (e.g., TMGI) or the service requirement (e.g., QoS information) of one or more MBMS services. At least one control configuration is determined based on to the required service type or QoS information one or more MBMS services. The at least one control configuration is transmitted to the UEs so that the UEs can efficiently receive the MBMS services.

In a further embodiment, upon receipt on the plurality of indication messages, the UEs are grouped into one or more groups based on the required service types or Qos information of the required service in the indication messages, so that UEs requiring the same services are grouped into the same group. One or more control configurations are determined based on the user requirements or the QoS requirements of the services, each corresponding to a group. The control configurations are transmitted to the UEs in each group respectively.

The control configuration comprises at least one of the following parameters: a multicast control channel (MCCH) configuration, MBMS control information configuration, or a MBMS scheduling configuration.

In an alternative embodiment, the MBMS area control information comprises a scheduling information of MBMS control channel corresponding each group. The dynamic MBMS control method can be periodically repeated based on the scheduling information, or upon receipt of changes of service requirements from the UEs.

The service requirement comprises at least one of the following parameters required for a corresponding service: a set of sessions, Temporary Mobile Group Identities (TMGIs), Quality of Service (QOS) requirement along with the sessions or TMGIs, latency parameters, and/or service reliability parameter such as maximum allowable packet loss rate.

The indication messages may be an uplink control information (UCI) report comprises a special kind scheduling request (SR) or buffer status report (BSR) indicating MBMS service type or the services QoS information.

Alternatively, the indication messages may be a media access control element (MAC CE—comprises a service type or service QoS information indication within the MAC logical channel.

The embodiments are being advantageous as the MBMS area control information are grouped to reduce UE processing power, without a need for awareness of which MCCHs are configured by RAN to carry the service/es that is interested in.

A further embodiment proposes a UE connectable to the MBSFN service area, receiving MBMS services dynamically controlled by a network node. The UE comprises at least a transmitter and a receiver. The transmitter transmits an indication message to the network node. The receiver receives the at least one control configuration to the UEs. The UE repeats the transmission of the network node when the service requirement is changed.

As an embodiment, the UE may transmit the indication messages via a media access control element (MAC CE); and the indication message comprises a service indication within the MAC logical channel. The UE's processing power is reduced because only information corresponding to the group is required to receive.

In a further embodiment, a telecommunication system operable in a MBSFN service area to provide MBMS services with dynamic MBMS control, is proposed. The telecommunication system comprises a plurality of UEs and at least one network node. The UEs transmit a plurality of indication messages each comprising a service requirement for one or more MBMS services. The network node receives the indication messages from the UEs, determines at least one control configuration based on the required one or more MBMS services, and transmits the at least one control configuration to the UEs.

Upon receipt on the plurality of indication messages, the network node groups the UEs into one or more groups based on the required service types or QoS information of the required services in the indication messages, so that UEs requiring the same service or the services have the same QoS requirements are grouped into the same group. The network node determines one or more control configurations each corresponding to one group, and transmits the control configurations to the UEs in each group respectively.

In a further embodiment, the indication messages may be a MBMS counting response RRC message, a temporary mobile group identity (TMGI) indication or session identity indication.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
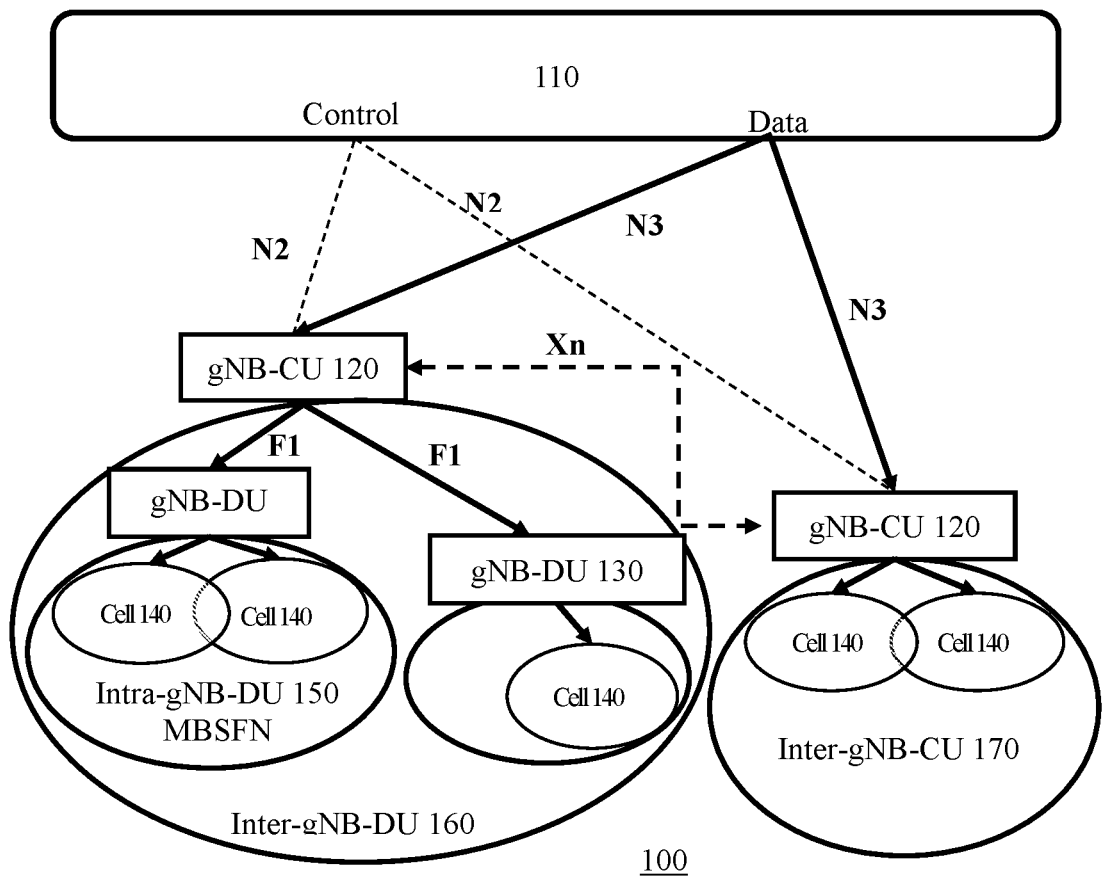
FIG. 1 shows an embodiment of telecommunication system 100 operating in a MBSFN area based on 5G NR according to the application.

The following description is of the best-contemplated mode of carrying out the invention. This description is made for the purpose of illustrating the general principles of the invention and should not be taken in a limiting sense. The scope of the invention is best determined by reference to the appended claims.

The requirements for the support of dynamic MBMS area configuration in NR MBMS have been appeared in many 3GPP documents such as TR 38.91, WID RP-193163 and TS22.261. In RP-193163 (R17-WID, NR MBMS): it specifies to study the support for dynamic control of the Broadcast/Multicast transmission area within one gNB-DU and specify what is needed to enable it, if anything [RAN2, RAN3]. In TR 38.913 clause 9.1 (5G MBMS Service requirement): it states to study the new RAT shall support dynamic adjustment of the Multicast/Broadcast area based on e.g. the user distribution or service requirements. TS 22.261 clause 6.13.2 regulates that the 5G system shall be able to setup or modify a broadcast/multicast service area within [1 s].

One of fastest possible way to achieve new radio (NR) MBMS RAN is to consider enhancing the LTE MBMS RAN to address NR MBMS requirements. However, regarding the current MBMS area control configuration particularly, there are many challenges and limitations (e.g . . . , in TS 36.300 and TS 36.330) need to be carefully addressed to achieve NR MBMS. For example, MBSFN area is static unless changed by operation and maintenance (O&M), so there is generally no dynamic change of area control information. Same control information is provided for the entire MBSFN area regardless that users within the area may have different service requirements. The MBMS control channel information e.g., multicast control channel (MCCH) is subsequentially statically configured i.e. both the time domain scheduling as well as the lower layer configuration does not change overtime when the service requirements from the UEs are changed.

MBMS in NR is targeting the support of a variety of emerging services that requires dynamic adjustment of MBMS area control information. However, current MBMS design has many limitations to achieve this requirement. The embodiment addresses these limitations by providing a method that allow dynamic adjustment of MBMS control information according to UEs service requirement. The major novelty of the method is that the method utilizes the service requirement as a design goal to enable the adjustment of MBMS control information as required by 3GPP in TR 38.913 and RP-1931 while still no any other proposal considered as a solution by 3GPP.

In one embodiment, the user requirements referred in the application can be one of the various parameters as listed below: a service ID or a session ID corresponding to one or more services the UE is requiring for, and QoS information (such as latency and packet, frame or bit error rate) related to the service ID or the session ID.

In a further embodiment, the MBMS area control information referred in the application can be the configurations used to schedule MCCH or the configuration used with the multicast control channel (such as MCCH repetition period, modification period, MCCH offset,).

MBMS in 5G NR is targeting the support of a wide range of 5G services with different QoS requirements (e.g., public safety, mission critical, V2X and IPTV applications). To achieve this goal, 5G MBMS RAN is expected to provide MBMS services according to UEs support dynamic adjustment of broadcast/multicast service area configuration within a reasonable time.

One embodiment of the application adjusts the MBSFN area control information according service requirements. In implementation, a MBSFN area is firstly defined as a group of cells within the MBSFN Synchronization area that are coordinated to achieve the transmission of MBMS service. One MBSFN area can cover multiple cells, and each cell can be part of up to 8 MBSFN areas. A MBSFN synchronization area is defined as a group of eNodeBs synchronized to perform MBSFN transmissions. An identical waveform with extended cyclic prefix (CP) is transmitted by all cells within the MBSFN synchronization area to all UEs, as if it is a single transmission. An MBSFN area may support a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs), and the remaining MCHs may multiplex a plurality of MTCHs. In 5G NR, different MBSFN area scenarios are expected due to the introduction of gNB split architecture in 5G NR network, hence new elements such as gNB-centralized unit (gNB-CU) and gNB distributed unit (gNB-DU) are introduced.

FIG. 1 shows an embodiment of telecommunication system 100 operating in a MBSFN area based on 5G NR, comprising a core network 110 interconnected to one or more gNB-CUs 120 using a control plane interface N2 and a user plane interface N3, the gNB-CU 120 is interconnected to a gNB-DU over F1 interface and over Xn (i.e., X2) logical interface to another gNB. Three possible MBSFN scenarios are shown in FIG. 1 as below.

1) Intra-gNB-DU MBSFN scenario 150: in which all cells 170 involved in MBSFN are inside one gNB-DU 130. The gNB-DU 130 MAC entity is in charge of enforcing the scheduling and radio resource allocation. No external interface is involved in this scenario, and no synchronization protocol is needed. Thus, the expected delays is low.

2) Inter-gNB-DU MBSFN scenario 160: for the case that all cells 170 are under coverage of more than one gNB-DU 130 under only one gNB-CU 120. In this case, the gNB-CU 120 is in charge of enforcing scheduling and radio resource allocation. F1 interfaces are involved in this scenario but the expected delay still low and no synchronization protocol is needed.

3) Inter-CU MBSFN scenario 170: for the case that all the cells 140 are spread over several gNB-DUs 130 and these gNB-DUs 130 belong to two or more gNB-CU 120. An anchor/master CU enforces the scheduling and radio resource allocation, and both Xn and F1 interfaces are involved thereby the expected delay is medium and a synchronization protocol is required.

Figure 2:
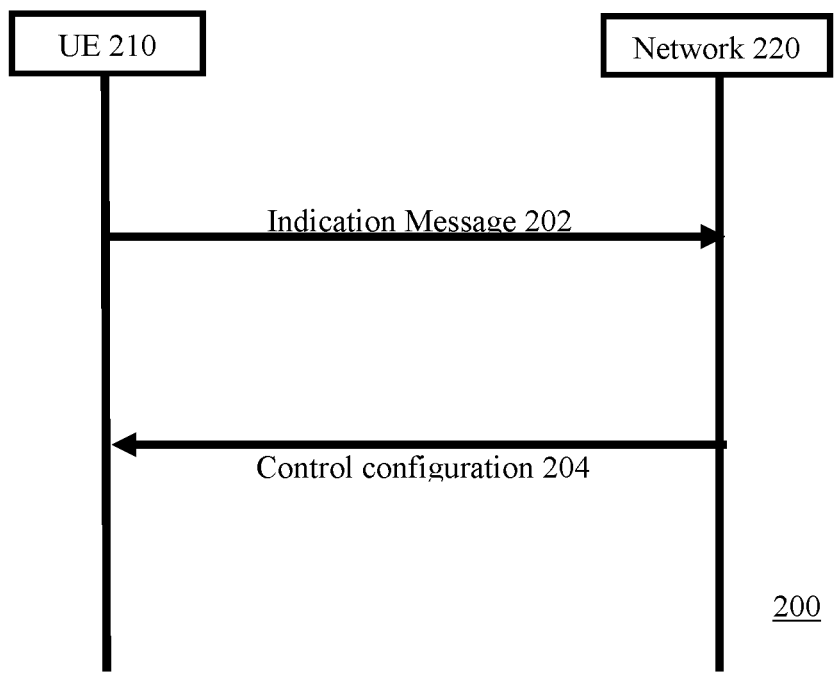
FIG. 2 shows an embodiment of the handshake between a UE 210 and the network 220.

FIG. 2 shows an embodiment of the handshake between a UE 210 and the network 220. A dynamic MBMS area control is disclosed. The network 220 employed in the embodiment is actually referred to as a higher level node known to the 5G NR experts, such as a RAN node, a core network node, or the gNB-CUs/gNB-DUs in charge of the enforcement of scheduling and radio resource allocations as described in the scenarios in FIG. 1. Therefore, the network 220 is a generalized term for easy description, not for limitation of the scope.

In FIG. 2, firstly one or more UEs 210 send indication messages 202 to the network 220, the indication message comprising service requirements specific for one broadcast service. The network 220 processes all the indication messages 202 from all UEs to determine a control configuration 204 that was then sent back to the UEs. The control configuration 204 comprises optimized parameters, such as MBMS control information corresponding to all the required broadcast services, so that the UEs 210 are configured accordingly to efficiently receive the required services respectively. The embodiment is adaptable for all the three scenarios as described in FIG. 1

Figure 3:
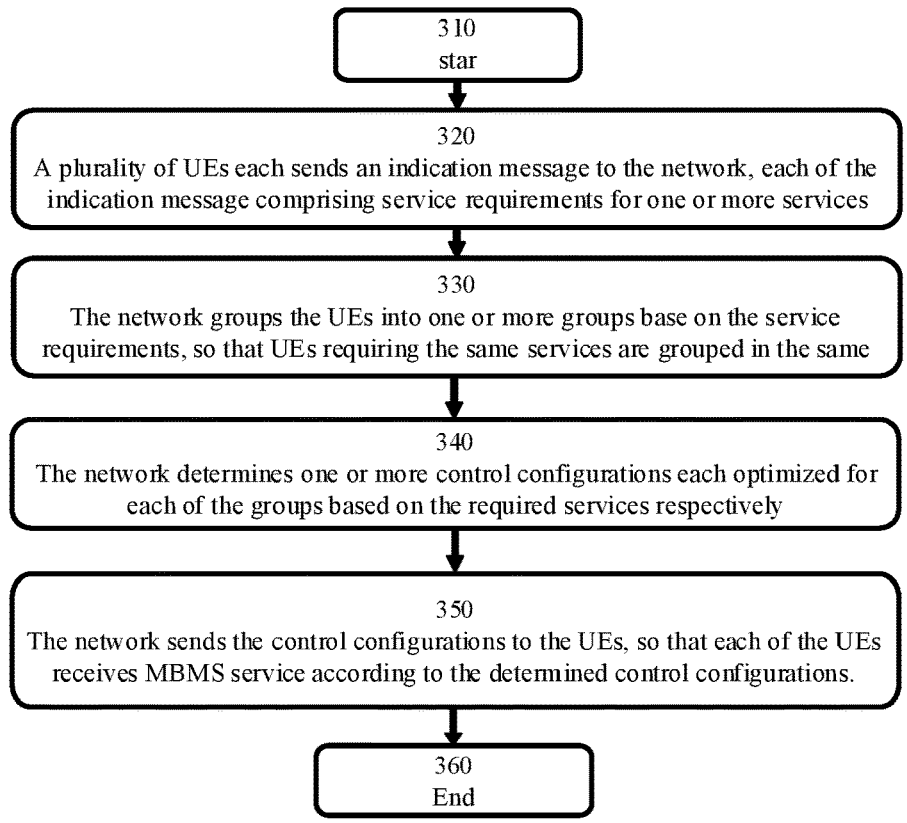
FIG. 3 is a flowchart of the dynamic MBMS control method according to an embodiment of the application.

FIG. 3 is a flowchart of the dynamic MBMS control method according to an embodiment of the application. The handshake in FIG. 2 is further explained. Step 310 starts the embodiment. In step 320, a plurality of UEs each sends an indication message to the network, when MBMS area control information adjustment is desirable.

As an embodiment, the indication message comprises an indication about UEs service requirements indicated via uplink control information (UCI) (e.g., through a special kind scheduling request (SR) or buffer status report (BSR) indicating MBMS service type or) or via media access control element (MAC CE) or via MBMS counting response RRC message (e.g., through temporary mobile group identity (TMGI) indication.

In step 330, upon receipt of the indication messages, the network groups the UEs into one or more groups based on the service requirements, so that UEs requiring the same services (or the set of services that have the same QoS requirements) are grouped in the same group. That is, within an MBSFN area, UEs are grouped into one or more groups (i.e. MBSFN service group areas) each corresponding to a service or set of services presented in the indication messages.

In step 340, the network determines one or more control configurations each optimized for a required service respectively. Specifically, the control configuration comprises MBMS control information corresponding to each MBSFN service group areas.

In step 350, the network then broadcast the control configurations the UEs, so that the UEs are configured respectively to receive the required services. Specifically, the UEs decode the control configuration to acquire a scheduling information of the MBMS-broadcasted by the service group area, so as to acquire the optimized control configuration for their required services on schedule.

The aforementioned steps can be periodically processed to keep the network updated with UEs' latest service requirements changes. In implementation, the scheduling of control information is delivered to UEs according to their service requirement, so the UEs are scheduled to receive and decode only required messages, hence reducing significant power consumptions. Furthermore, the scheduling of MBMS control channel can use the same periodicity or interval as used for scheduling the common unicast transmission (i.e. subframe, slot), thus the MBMS and unicast scheduling and reception procedures are simplified.

Figure 4:
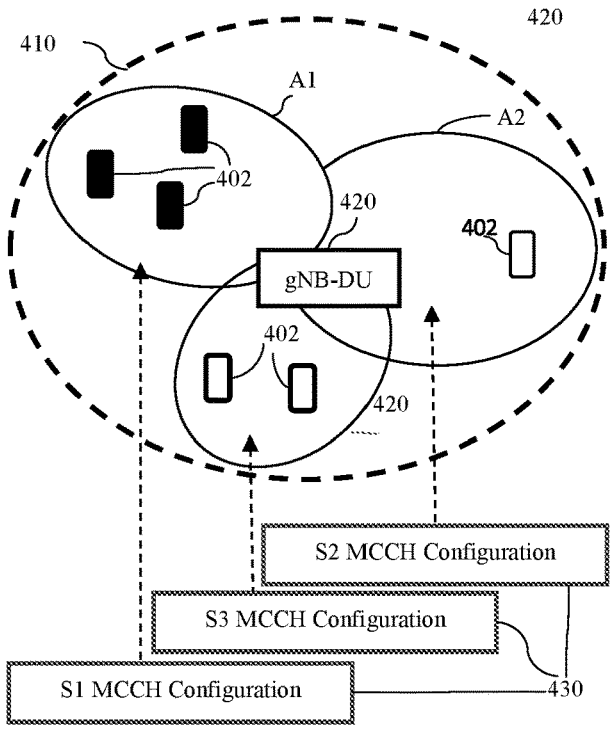
FIG. 4 shows a MBSFN service area 400 according to an embodiment of the application.

FIG. 4 is a MBSFN area 400 according to an embodiment of the application. The MBSFN area 400 is under a coverage of a gNB-DU 420, comprises a plurality of UEs 402, provides multiple broadcast services such as S1 (e.g., group communication services), S2 (e.g., V2X service) and S3 (e.g., IPTV services).

Conventionally, the control information such as MCCH configuration and notification are all unified for all UEs irrespective of their service requirement, rendering poor support for applications with different QoS requirements over the same 5G MBMS area (e.g., mission critical and V2X have different latency requirement from IPTV and group communication applications). The embodiment provided herein solved the problem.

In FIG. 4, all UEs 402 will first send to gNB-DU 420 (gNB-DU 420 being one possible embodiment of the network 220) indication messages about their service requirements via a UCI report (e.g., new type of indication fields on SR or BSR indicating MBMS service type) or via MAC control element (CE) or via TMGI indication (e.g., using UE MBMS counting response message).

Then, the gNB-DU 420 groups the UEs 402 according to their service or services requirement into a different groups A1, A2 and A3 within the MBSFN area 410. The groups A1, A2 and A3 are also referred to as MBSFN service group areas. Each UE can belong to multiple groups if it is requiring for multiple services, and receive multiple MBMS control information corresponding to each MBSFN service group areas.

As shown in FIG. 4, the gNB-DU 420 groups two UEs 402 into a same group A1 as the two UEs 402 are interested in the same service S1, and assigns a MCCH configuration S1 to the group A1. Likewise, a MCCH configuration S2 is assigned to group A2, and a MCCH configuration S3 for group A3.

In addition to that, the network will also adjust the assignment of configuration according to UEs service requirements change (i.e. redefines the MBSFN service group area according to service requirement).

According to the current design of MBMS in TS-36.331 and TS 36.300, when an MBMS capable UE enters an MBSFN area and demands for an MBMS service, the UE first acquires a SystemInformationBlockType2 (SIB2) broadcasted on the broadcast control channel (BCCH) by the MBMS cell within the MBSFN area. After reading the contents of SIB2, the UE acquires the MBMS subframe allocation information defined by mbsfn-SubframeConfig-List information element (IE) (i.e. radio frames reserved for MBMS transmission on PMCH and radio frames reserved for unicast transmissions on PDSCH). After determining the subframes allocated for MBMS, if the UE is demanding for the MBMS services, it acquires a SystemInformationBlock-Type13 (SIB13).

The SIB13 comprises at least the following information elements (IEs): MBSFN-AreaInfoList IE containing information fields leading to the MBMS control information associated with one or more MBSFN areas; MBSFN-AreaID that identifies the MBSFN area; non-MBSFNregionLength indicating the non-MBSFN symbols region in MBSFN subframe; NotificationIndicator comprising a PDCCH bit for notifying the UE about change of the MCCH applicable for this MBSFN area; and MCCH-Config containing a MCCH configuration.

The MCCH configuration further comprises: MCCH modification period (MCCH-ModificationPeriod); MCCH repetition period (MCCH-RepetitionPeriod); MCCH offset (MCCH-Offset); bitmap (i.e. sf-AllocInfo) that indicates one or more subframe that may carry MCCH scheduling and the modulation and coding (MCS) applicable to the subframes (i.e. the singnallingMCS); MCCH-ModificationPeriod defines periodicty (or the boundaries i.e. radio frames in which SFN mod MCCH-ModificationPeriod=0) during which the context of MCCH may be changed, and the MCCH-Offset indicates, together with the MCCH-RepetitionPeriod, the radio frames in which MCCH is scheduled (i.e. radio frames satisfy the equation: SFN mod MCCH-RepetitionPeriod=MCCH-Offset).

From the MCCH configuration in the SIB13, the UE obtains a message MCCH-Message that contains the MBMS area configuration. The MBMS-NotificationConfig contains a NotificationOffset IE which indicates, together with a NotificationRepetitionCoeff IE, the radio frames in which the MCCH change notification is scheduled (i.e. radio frames that satisfy: SFN mod NotificationRepetitionCoeff=NotificationOffset). The actual change notification repetition period for the all scheduled MCCHs is equal to the shortest value among the MCCH-ModificationPeriod and the NotificationRepetitionCoeff. The MBMS-NotificationConfig IE also includes a NotificationSF-Index IE which indicates the subframe used to transmit MCCH change notifications on physical downlink control channel (PDCCH)(i.e. for FDD: the value 1, 2, 3, 4, 5 and 6 correspond with subframe #1, #2, #3 #6, #7, and #8 respectively and for TDD the value 7, 8, 9 and 10 correspond with subframe #0, #4, #5 and #9 respectively).

From the conventional protocol, a disadvantage is identified. There is no indication about UE service requirement being communicated by UEs to the network for the purpose of adjusting or updating of MBMS area control configuration (i.e., adjusting of the MBSFN area control information configurations given by MBSFN-AreaInfoList as well as the MCCH configuration given by the MCCH-config IE).

In one proposed embodiment, the UEs send indication messages about their service requirements e.g., via uplink control information (UCI) (i.e., using a special kind scheduling request (SR) and/or buffer status report (BSR), requiring for one or more demanded MBMS service. Another possible embodiment of indication could be via a MAC CE that indicates an identity of the logical channel associated with the MBMS traffic pattern corresponding to the desired service if the network employs the same logical channel for the service/services that are associated with the MBSFN service group area.

An alternative embodiment of the indication about the UEs service requirements can be also send to the network by RRC MBMS counting response. The RRC MBMS counting response is sent by UE as a response to the RRC counting request message sent by the network indicating the TMGI and/or logical channel identity of MBMS traffic type of to be counted.

As an alternative embodiment shown in Table 1 below, in the network counting request message MBMSCountingRequest, a new information element namely, CountingRequestInfo-NR is proposed to indicate periodicity at which the network sends the counting request to UEs, and logical-ChannelIdentity-nr to indicate the other counting related information introcuaded in NR such as the logical channel identity of the services to be counted. The counting periodicity within n CountingRequestInfo-NR is given by parameter of the Counting-periodicity-nr in which the periodicity 0.5rf denotes half radio frame or 1rf denotes one radio frame (i.e., half radio frame and 1 radio frame are used as an example other values are not precluded).

TABLE 1

MBMSCountingRequest
MBMSCountingRequest message

```
MBMSCountingRequest-r10   ::=        SEQUENCE {
  countingRequestList-r10              CountingRequestList-r10,
  lateNonCriticalExtension             OCTET STRING                OPTIONAL,
  nonCriticalExtension                 CountingRequestInfo-NR      OPTIONAL
}
CountingRequestList-r10   ::= SEQUENCE (SIZE (1..maxServiceCount)) OF CountingRequestInfo-r10
CountingRequestInfo-r10   ::=        SEQUENCE {
  tmgi-r10                             TMGI-r9,
}
CountingRequestInfo-NR::=             SEQUENCE {
  Counting-request-info-nr             CountingRequestInfo-NR ,
  Counting-periodicty-nr               ENUMERATED { 0.5rf, 1rf }
  ...
}
CountingRequestInfo-NR  ::=          SEQUENCE {
  tmgi-nr                              TMGI-r9,
  logicalChannelIdentity-nr            logicalChannelIdentity-r9   OPTIONAL, -- Need OR
  ...
}
```

Another disadvantage is identified from the conventional protocol. The control information provided by MBSFN-AreaInfoList IE in SystemInformationBlockType13 regarding MCCH control information and notifications configuration, are all provided as per-MBSFN area basis irrespective of UEs requirement within the MBMS area, whereas in NR MBMS a variety set of services are supported with different QoS requirements. It is highly possible that different UEs within MBSFN area to be interested in different services.

A proposed embodiment addresses that problem by grouping. UEs belong to an MBSFN area according to their service requirement are grouped into one or more service group areas (i.e. MBSFN sub-areas) within the MBSFN area, and the MCCH control information are provided per MBSFN service group (i.e. each MBSFN service group corresponds to an individual MCCH configuration). As an embodiment of implementation, a new IE namely MBSFN-AreaInfoList-NR within system information block defined in NR to carry MBMS associated control information in NR. Within the MBSFN-AreaInfoList-NR IE, a new IE mbsfn-SubAreaInfoList-NR is defined to indicate the MBMS control information associated with the list of MBSFN service group areas within the MBSFN area. Additionally, a new IE MBSFN-SubAreaInfo-NR is defined to indicate the MBMS control configuration for each individual MBSFN service group area as illustrated by Table 2.

510, a plurality of MCCH messages 502 are transmitted for a modification period 504 with a repetition period 520. One disadvantage is identified therefrom. There is only one possible MCCH scheduling configuration option provided by MBSFN-AreaInfoList-NR IE, in which the MCCH content 502 is configured to with a modification period 504 between 10 ms to 1024 ms, whereas the repetition period 520 has a configurable periodicity of 10 ms to 2560 ms. Such a configuration is insufficient to properly arrange all types of MBMS services targeted in 5G NR due to the different QoS requirement of the services (e.g., some services are latency sensitive and others are not, and some services need a higher reliability level than other).

Figure 6:
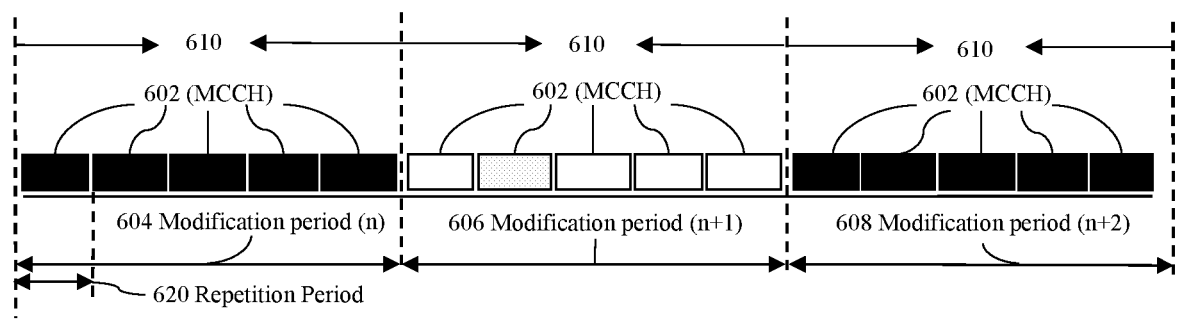
FIG. 6 shows a signal time sequence according to an embodiment of the application.

FIG. 6 shows a signal time sequence chart according to a proposed embodiment addressing the problem. The MCCH configuration can be defined on frame basis. The MCCH content 602 (i.e. MBSFN Area configuration) is modified on a frame or a fraction of frame basis (e.g., every 5 subframes). The modified MCCH are repeated according to the bitmap that indicates subframes/slots/mini-slots per frame or fractions of frame that may carry MCCH scheduling. The size of the bitmap that defines the subframes/slots/mini-slots carry MCCH scheduling is given in Table 3. In this table, the number of mini-slots per frame is determined assuming a normal cyclic prefix and the OFDM symbols occupied by a mini-slot are two, four and seven respectively. In frame-

TABLE 2

MBSFN-AreaInfoList-NR
MBSFN-AreaInfoList-NR

```
MBSFN-AreaInfoList-NR   ::=          SEQUENCE (SIZE(1..maxMBSFN-Area))
OF MBSFN-AreaInfo-NR
MBSFN-AreaInfo-NR       ::=          SEQUENCE {
  mbsfn-AreaId-NR                      MBSFN-AreaId-r12
  mbsfn-SubAreaInfoList-NR             MBSFN-SubAreaInfoList-NR
  non-MBSFNregionLength                ENUMERATED {s1, s2},
  notificationIndicator-r9             INTEGER (0..7),
}
MBSFN-SubAreaInfoList-NR::= SEQUENCE (SIZE (1..maxSubArea-PerArea)) OF MBSFN-SubAreaInfo-NR
MBSFN-SubAreaInfo-NR  ::= SEQUENCE {
    ... Control configuration for MBSFN service group area ...
}
```

Figure 5:
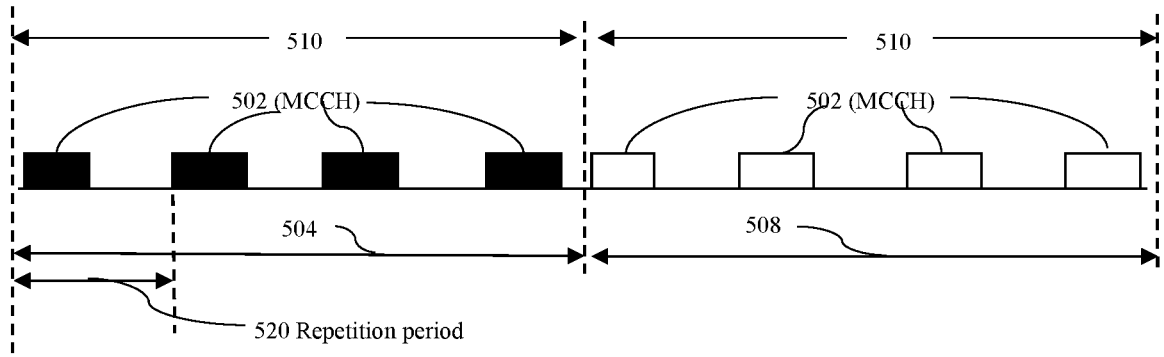
FIG. 5 shows a conventional signal time sequence of MBMS control.

FIG. 5 is a signal time sequence of conventional MCCH scheduling protocol. Within one or multiple radio frames based MCCH configuration, either periodical MBMS counting RCC response or UCI report can be used by network to adjust or modify MCCH configuration periodically. This type of configuration is suitable for MBMS service with moderate latency requirement such as IPTV. For example, within one frame or one fraction of frame 610, the modification periods 604~608 are subsequently aligned to the frame or fraction of frame 610. Five MCCH content 602 can be repeated before next modification, each occupies a repetition period 602.

TABLE 3 bitmap size for frame based MCCH configuration
(i.e. half radio frame)

| Numerology μ | Subcarrier Spacing | Subframe Per Half Frame | Slots Per Half Frame | Mini-Slots Per Half Frame |
|---|---|---|---|---|
| 0 | 15 | 5 | 5 | 35, 15, 10 |
| 1 | 30 | 5 | 10 | 70, 30, 20 |
| 2 | 60 | 5 | 20 | 140, 60, 40 |
| 3 | 120 | 5 | 40 | 280, 120, 80 |
| 4 | 240 | 5 | 80 | 560, 240, 160 |

Figure 7:
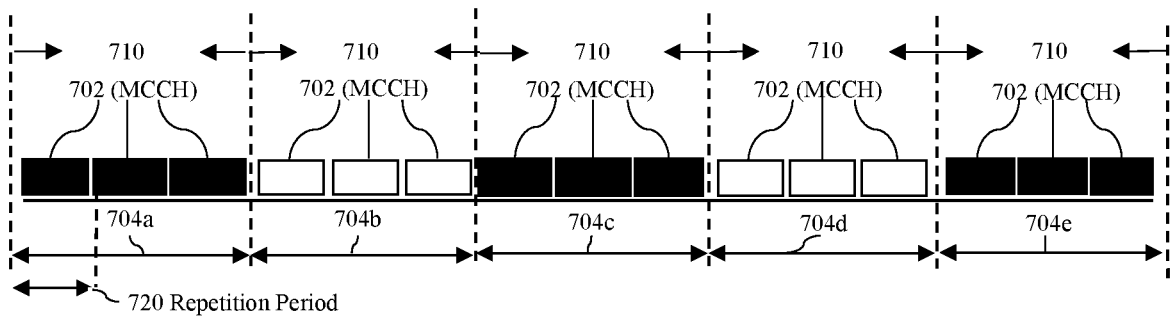
FIG. 7 shows a signal time sequence according to an embodiment of the application.

FIG. 7 is a signal time sequence chart based on a further embodiment. A subframe based MCCH configuration is proposed. In this type of configuration, the MCCH content 702 is modified on a subframe basis and the repetition of the modified MCCH is on a slot-by-slot or mini-slot by mini-slot basis according to a bitmap that indicates the MBMS slots or mini-slots per sub-frame that may carry MCCH scheduling.

Similarly, A Slot-based MCCH configuration can be also considered for MBMS NR, in such a configuration MCCH content 702 is modified on a slot-by-slot basis and the modified content is repeated on a mini-slot-by-mini-slot basis according to bitmap that indicates the mini-slots per slot that may carry MCCH scheduling.

The size of the bitmap that defines the slots/mini-slots carry MCCH scheduling is given in Table 4. In subframe-based and slot-based MCCH configuration, a periodical UEs UCI report can be set to the network to adjust or modify MCCH configuration just similar to the common unicast scheduling used in NR. These two types of scheduling are suitable for latency sensitive MBMS services such as V2X applications. For example, within one subframe or slot 710, the modification periods 704a-704e are subsequently aligned to the subframe or slot 710. Three MCCH content 702 can be repeated before next modification, each occupies a repetition period 702.

TABLE 4

Example for the bitmap size for subframe
based MCCH configuration.

| Numerology μ | Subcarrier Spacing | Slots Per SubFrame | Minislots Per SubFrame |
|---|---|---|---|
| 0 | 15 | 1 | 7, 3, 2 |
| 1 | 30 | 2 | 14, 6, 4 |
| 2 | 60 | 4 | 28, 12, 8 |
| 3 | 120 | 8 | 56, 24, 16 |
| 4 | 240 | 16 | 112, 48, 32 |

A further embodiment proposes a Non-periodical MCCH configuration. In this type of configuration, we propose to modify MCCH content and repeat the modified MCCH in according non-periodical report sent by UE indicating the change in UEs service requirement (i.e. defined by non-periodical parameter within MCCH-ModificationPeriod-NR IE). This type of configuration is not required to request resources form UE periodically, which could save saving control plan overhead, and it is suitable for MBMS service that do not frequently changes over the time.

To indicate the options of MCCH configurations for FIGS. 6 and 7, a new IE is defined for each MBSFN service group area indicated by mbsfn-SubAreaId-nr within MBSFN-SubAreaInfo-NR IE, namely, MCCH-Config-nr to indicate the MCCH configuration associated with that specific MBSFN service group area. Within the MCCH-Config-nr, an IE MCCH-ModificationPeriod-NR is defined to indicate MCCH modification period used. Within MCCH-ModificationPeriod-NR the parameters frame-basis indicates an MCCH modification occurs and the value subframe-basis indicates the MCCH modification occurs every radio frame. In addition, a MCCH repetition period is defined using MCCH-RepetitionPeriod-NR IE, which contains the parameters such as MCCH-RepetitionFrame, MCCH-RepetitionSubfrmae and MCCH-RepetitionSlot that defines the repetition period for the frame based, subframe based and slot based MCCH configuration respectively. A IE MCCH-AllocInfo-NR is defined to be used for indicating the subframes (i.e. defined by AllocInfoFrame) or slots (i.e. defined by AllocInfoSubFrame)) or mini-slots (i.e. defined by AllocInfoSlot) that may carry the MCCH scheduling information. The length or size of the bitmap used to determine the subframes, slots or mini-slots that may carry MCCH scheduling is given by the parameter AllocPerFrameNRBitmap, AllocPerSubframeNRBitmap, and AllocPerSlotNRBitmap for frame-based, subframe-based and slot-based MCCH configuration respectively. Furthermore, a new IE is defined for each service group within an MBSFN area indicated by the mbsfn-SubAreaId-nr,namely, notificationIndicator-NR IE to indicate which PDCCH bit is used to notify the UE about the change of the MCCH applicable for this MBSFN service group area.

TABLE 5

MBSFN-AreaInfoList-NR
MBSFN-AreaInfoList-NR

```
MBSFN-AreaInfoList-NR ::=            SEQUENCE (SIZE(1..maxMBSFN-Area))
OF MBSFN-AreaInfo-NR
MBSFN-AreaInfo-NR ::=                SEQUENCE {
    mbsfn-AreaId-NR                      MBSFN-AreaId-r12
    mbsfn-SubAreaInfoList-NR         MBSFN-SubAreaInfoList-NR
}
MBSFN-SubAreaInfoList-NR::= SEQUENCE (SIZE(1..maxSubArea-PerArea)) OF MBSFN-SubAreaInfo-NR
    MBSFN-SubAreaInfo-NR ::= SEQUENCE {
       mbsfn-SubAreaId-nr                Sub-AreaId-nr
         MCCH-Config-nr                  SEQUENCE {
      MCCH-ModificationPeriod-NR ENUMERATED {frame-basis,subframe-basis,Slot-basis,
                                       non-perodical }
```

TABLE 5-continued

MBSFN-AreaInfoList-NR
MBSFN-AreaInfoList-NR

```
  MCCH-RepetitionPeriod-NR              CHOICE {
    MCCH-RepetitionFrame                  ENUMERATED {subframe,slot,mini-slot},
    MCCH-RepetitionSubfrmae                ENUMERATED {slot, mini-slot},
    MCCH-RepetitionSlot                  ENUMERATED {mini-slot},
  }
  MCCH-AllocInfo-NR                      CHOICE {
    AllocInfoFrame                     BIT STRING(SIZE( AllocPerFrameBitmap)),
    AllocInfoSubFrame                    BIT STRING(SIZE(AllocPerSubframeBitmap)),
    AllocInfoSlot                     BIT STRING(SIZE(AllocPerSlotBitmap)),
    signallingMCS-r9                      ENUMERATED {n2, n7, n13, n19 }
                                        }
  notificationIndicator-NR             CHOICE {
    notification-IndexSubFrame              INTEGER (0..SIZE(AllocPerFrameBitmap)),
    notification-IndexSlot             INTEGER (0..SIZE(AllocPerSubframeBitmap)),
    notification-IndexMiniSlot             INTEGER (0..SIZE(AllocPerSlotBitmap))
                                        }
                                      }
AllocPerFrameBitmap    ::= ENUMERATED {SubframePerframe,SlotPerFrame,minislotPerFrame},
AllocPerSubframeBitmap::= ENUMERATED {slotPerSubframe, minislotPerSubFrame},
AllocPerSlotBitmap    ::= ENUMERATED {minislotPerslot},
```

Conventionally, the same MBMS notification configuration is applied for all MBSFN areas and the MCCH change on PDCCH is indicated using the indexes of the subframes within the radio frame that are possible to carry MCCH change assuming only the radio frame based configuration is used in LTE. In NR it is possible that every MBSFN area to have a different notification configuration or even every individual MBSFN service group area within the MBSFN area could have different configuration from others due to the differences in UE's requirement and the service broadcasted by each MBSFN service group area.

An embodiment is proposed to provide a MBMS notification configuration as well as the MCCH change notification on PDCCH in a per MBSFN service group area basis.

IE to be used to indicate MBMS notification information associated with list of MBSFN service group areas associated with the MBSFN area. In addition, we propose also to define SubAreallotifiConfig-NR IE to be used to indicate the MBMS notification configuration for each individual MBSFN service group area. Moreover, we propose to indicate the MCCH change notification on PDCCH is according to type of MCCH configuration used (i.e. frame-based, subframe-based and slot-based configuration); thereby, we propose to indicate the notification indexes used for MCCH change using notification-Index-NR, which; indicates the indexes of subframes or slots or the mini-slot).

TABLE 6

MBMS-NotificationConfig-NR
MBMS-NotificationConfig-NR

```
MBMS-NotificationConfig-NR  ::= SEQUENCE {
  mbsfn-AreaId-NR                            MBSFN-AreaId-r12
  notificationConfigList-nr               SubAreaNotifiConfiglist-NR
}
SubAreaNotifiConfiglist-NR::=
SEQUENCE (SIZE(1..maxSubArea-PerArea)) OF SubAreaNotifiConfig-NR\
SubAreaNotifiConfig-NR::=                SEQUENCE {
  mbsfn-SubAreaId-nr                       Sub-AreaId-nr
  notificationRepetitionCoeff-nr              ENUMERATED {n2, n4},
    notificationOffset-nr                     INTEGER (0..10),
  notification-Index-NR                    CHOICE {
    notification-IndexSubFrame                 INTEGER (1..SIZE(AllocPerFrameBitmap)),
    notification-IndexSlot                 INTEGER (1..SIZE(AllocPerSubframeBitmap)),
    notification-IndexMiniSlot                 INTEGER (1..SIZE(AllocPerSlotBitmap))
                                             }
}
```

In a way such that each individual MBSFN service group area within the MBSFN area can be configured using different notification configuration and a different MCCH change notification according to the MCCH configuration used for the MBMS service broadcasted by the MBSFN service group area. To achieve that, we propose to define a new information element for MBMS notification in NR namely, MBMS-NotificationConfig-NR within system information block defined to carry MBMS notification information in NR. Within the MBMS-NotificationConfig-NR IE, we further propose to define SubAreallotifiConfiglist-NR The embodiment introduces a new mechanism for the scheduling of control information of multicast/Broadcast area in 5G NR MBMS System that has the following invention over the existing MBMS design The embodiment provides the scheduling of the control information for UEs according to their service requirements, which is one of the design goal in NR MBMS. Several effects can be identified. The MBMS area control information in the embodiment is periodically adjusted as the user requirements change overtime. The scheduling in the MBMS control channel uses the same periodicity or interval as the unicast scheduling (i.e. sub-frame, slot). Such a unified scheduling simplifies the reception procedures at UE side, i.e., the UEs can receive both MBMS and unicast by monitoring only one scheduling periodicity. The embodiment enables UEs to receive only the control configuration for the demanded service, such that the processing power is reduced. The embodiment is advantageous for providing various support options comprising subframe, slot, and mini-slot scheduling, selectable based on UE service requirements.

The major advantage effect of grouping is allowing UEs to monitor only the control information or the MCCH configuration for the service/services that is interested to receive which can help in reducing the UE processing power. According to the MBMS current design in standards TS 36.331 clause 5.8.2, TS 36.331-5.8.1.3 and TS-36.300-15.3.6 UEs have to acquire/monitor the MCCH(es) configuration for all services provided by the MBSFN area to guarantee that it will monitor the MCCH configuration of the services its interested in. The described embodiments enable the UE to monitor only the control information configuration (MCCH configuration) associated with group that associated with or the service/services that is interested to receive (i.e., without a need for awareness of which MCCHs are configured by RAN to carry the service/es that is interested in). In other words, NG-RAN configures for UEs only the MCCH(s) that associated with the service/es of their interest and UEs will only monitor these configured MCCH, leading to a reasonable processing power reduction at UE side.

Figure 8:
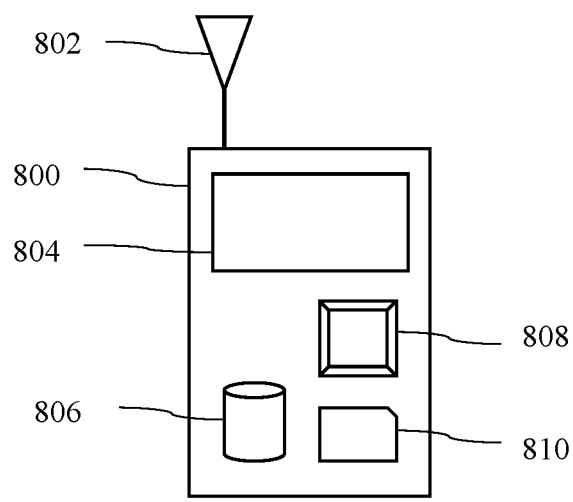
FIG. 8 is a diagram of a UE 800 according to an embodiment of the application.

FIG. 8 is a diagram of a UE 800 according to the embodiment of the application. The UE 800 generally comprises a transceiver 802, a display 804, a storage 806, a processor 808 and a Subscriber Identity Module (SIM) card 810. The transceiver 802 is also known as a combination of a transmitter and a receiver, functional for both signal transmissions and receptions since the hardware structure of the transmitter and the receiver can be shared and integrated into one module. The embodiment of the dynamic MBMS control is basically software implementations that are presented as software or firmware stored in the storage 806, and executed by the processor 808. Therefore, there is no specific limitation in the hardware structure of the UE 800, which can be a phone, a tablet, a computer, a video streaming device, a set top box or any subscriber enabled communication device. The embodiment of the UE 800 is described by the behaviors as summarized below, Each of the UEs within the MBSFN service area sends an indication message to the network via UCI, MAC CE and/or RRC. The indication message comprise the information about service requirements for the required services respectively. The service requirements can be, specifically, service types and/or QoS information of the required services. The indication message serves as a basis for the network to dynamically adjust the MCCH configurations.

As described, the network groups a plurality of UEs 800 into one or more groups based on their service requirements respectively, and generate the control configurations for each group. Thereby, through broadcasting, the UEs 800 in each group receive only a sub-set of the total control configurations that is related to their group. Each UE 800 monitors and decodes the control configuration associated with the service(es) broadcasted from the corresponding group so that they can receive the related MBMS service(es).

In summary, the embodiment of the UE 800 is connectable to a MBSFN service area, receiving MBMS services dynamically controlled by a network node. A transceiver 802 in the UE functions as a transmitter to transmit an indication message to the network node, so that the network determines at least one control configuration based on to the required one or more MBMS services. The transceiver 802 then functions as a receiver to receive the at least one control configuration.

Based on FIG. 1, an embodiment of a telecommunication system 100 implementing the described method for dynamic MBMS control, can be summarized as below. The telecommunication system 100 is known to be operable in a MBSFN service area to provide MBMS services with dynamic MBMS control, comprising at least a network node and a plurality of UEs. In the embodiment, the UEs (not shown in FIG. 1; presuming they are randomly distributed inside the cells 140) transmit a plurality of indication messages each comprising a service requirement for one or more MBMS services. The network node (i.e., gNB-DU 130 or gNB-CU 120) receives the indication messages from the UEs, determines at least one control configuration based on the required one or more MBMS services, and transmits the at least one control configuration to the UEs.

All the related steps processed by the UE and the telecommunication system are already described from the aforementioned embodiments of the method of MBMS dynamic control and FIGS. 2 to 7, therefore the details would not be repeated again here.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamic MBMS control, for a network node in a MBSFN service area to provide MBMS services to one or more UEs, comprising:
    receiving a plurality of indication messages from one or more user equipment; wherein each of the indication messages comprises service requirement for one or more MBMS services;
    determining at least one control configuration based on the required one or more MBMS services; and
    transmitting the at least one control configuration to the UEs,
    wherein the indication messages comprises at least one of the following messages: MBMS counting response RRC message, a temporary mobile group identity (TMGI) indication or session identity indication.

2. The method for dynamic MBMS control as claimed in claim 1, further comprising:
    upon receipt on the plurality of indication messages, grouping the UEs into one or more groups based on the required service types or QoS information of the required services in the indication messages, so that UEs requiring the same service or services have the same QoS requirements are grouped into the same group;
    the determining step comprises determining one or more control configurations each corresponding to one group;
    the transmitting step comprises transmitting the control configurations to the UEs in each group respectively.

3. The method for dynamic MBMS control as claimed in claim 2, wherein the control configuration comprises at least one of the following parameters: a multicast control channel (MCCH) configuration, MBMS area control information, or a scheduling configuration.

4. The method for dynamic MBMS control as claimed in claim 3, wherein the MBMS area control information comprises a scheduling information of MBMS control channel corresponding each group; and
the method further comprises:
repeating the determining and transmitting steps based on the scheduling information, or upon receipt of changes of service requirements from the UEs.

5. The method for dynamic MBMS control as claimed in claim 1, wherein the service requirement comprises at least one of the following parameters required for a corresponding service: a set of sessions, Temporary Mobile Group Identities (TMGIs), Quality of Service (QOS) requirement along with the sessions or TMGIs, latency parameters and/or reliability parameters including maximum allowable packet or frame or bit error rate.

6. The method for dynamic MBMS control as claimed in claim 1, wherein the receiving step comprises receiving the indication messages via an uplink control information (UCI); wherein the indication message comprises a special kind scheduling request (SR) or buffer status report (BSR) indicating MBMS service type and/or the service QoS information; or
the receiving step comprises receiving the indication messages via a media access control element (MAC CE); wherein the indication message comprises a service indication within the MAC logical channel.

7. A user equipment, connectable to a MBSFN service area, receiving MBMS services dynamically controlled by a network node, comprising:
a transmitter, transmitting an indication message to the network node; wherein:
the indication message comprises service requirement for one or more MBMS services; and
the network determines at least one control configuration based on to the required one or more MBMS services; and
a receiver, receiving the at least one control configuration to the UEs,
wherein the indication messages comprises at least one of the following messages: MBMS counting response RRC message, a temporary mobile group identity (TMGI) indication or session identity indication.

8. The user equipment as claimed in claim 7, wherein:
the user equipment receives a control configuration corresponding to a group of UEs requiring the same service or QoS requirement.

9. The user equipment as claimed in claim 8, wherein the control configuration comprises at least one of the following parameters: a multicast control channel (MCCH) configuration, MBMS area control information, or a scheduling configuration.

10. The user equipment as claimed in claim 9, wherein the MBMS area control information comprises a scheduling information of MBMS control channel corresponding to the group; and
the user equipment repeats the transmission of the network node when the service requirement is changed.

11. The user equipment as claimed in claim 7, wherein the service requirement comprises at least one of the following parameters required for a corresponding service: a set of sessions, Temporary Mobile Group Identities (TMGIs), Quality of Service (QOS) requirement along with the sessions or TMGIs, latency parameters and/or reliability parameters including maximum allowable packet or frame or bit error rate.

12. The user equipment as claimed in claim 7, wherein the user equipment transmits the indication messages via an uplink control information (UCI); wherein the indication message comprises a special kind scheduling request (SR) or buffer status report (BSR) indicating MBMS service type and/or the service QoS information; or
the user equipment transmits the indication messages via a media access control element (MAC CE); and the indication message comprises a service indication within the MAC logical channel.

13. A telecommunication system, operable in a MBSFN service area to provide MBMS services with dynamic MBMS control, comprising:
a plurality of UEs, transmitting a plurality of indication messages each comprising a service requirement for one or more MBMS services; and
a network node, receiving the indication messages from the UEs, determines at least one control configuration based on the required one or more MBMS services, and transmits the at least one control configuration to the UEs,
wherein upon receipt on the plurality of indication messages, the network node groups the UEs into one or more groups based on the required service types or QoS information of the required services in the indication messages, so that UEs requiring the same service or the services have the same QoS requirements are grouped into the same group;
the network node determines one or more control configurations each corresponding to one group,
wherein the control configuration comprises at least one of the following parameters: a multicast control channel (MCCH) configuration, a scheduling information of MBMS control channel corresponding each group, or a scheduling configuration;
the network transmits the control configurations to the UEs in each group respectively and repeats the user equipment grouping and the control configuration transmission based on the scheduling information, or upon receipt of changes of service requirements from the UEs.

14. The telecommunication system as claimed in claim 13, wherein the service requirement comprises at least one of the following parameters required for a corresponding service: a set of sessions, Temporary Mobile Group Identities (TMGIs), Quality of Service (QOS) requirement along with the sessions or TMGIs, latency parameters and/or reliability parameters including maximum allowable packet or frame or bit error rate.

15. The telecommunication system as claimed in claim 13, wherein the UEs transmit the indication messages via an uplink control information (UCI); and each of the indication message comprises a special kind scheduling request (SR) or buffer status report (BSR) indicating MBMS service type and/or the service QoS information; or
the UEs transmit the indication messages via a media access control element (MAC CE); and
the indication message comprises a service indication within the MAC logical channel.

* * * * *